US009141981B2

(12) United States Patent
Brown

(10) Patent No.: US 9,141,981 B2
(45) Date of Patent: Sep. 22, 2015

(54) METHOD, SYSTEM, AND COMPUTER PROGRAM PRODUCT FOR LONG-TERM ON-LINE COMPARISON SHOPPING

(75) Inventor: Kyle Brown, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2002 days.

(21) Appl. No.: 10/687,714

(22) Filed: Oct. 17, 2003

(65) Prior Publication Data

US 2005/0086121 A1   Apr. 21, 2005

(51) Int. Cl.
*G06Q 30/00* (2012.01)
*G06Q 30/06* (2012.01)

(52) U.S. Cl.
CPC ............ *G06Q 30/06* (2013.01); *G06Q 30/0625* (2013.01)

(58) Field of Classification Search
USPC ........................................ 705/26, 27, 37, 26.1
See application file for complete search history.

(56) References Cited

U.S. PATENT DOCUMENTS

| | | | |
|---|---|---|---|
| 6,892,186 B1 * | 5/2005 | Preist | 705/37 |
| 7,107,225 B1 * | 9/2006 | McClung, III | 705/14 |
| 2002/0143655 A1 * | 10/2002 | Elston et al. | 705/26 |
| 2003/0033179 A1 * | 2/2003 | Katz et al. | 705/7 |
| 2005/0010494 A1 * | 1/2005 | Mourad et al. | 705/26 |
| 2005/0228735 A1 * | 10/2005 | Duquette | 705/37 |
| 2012/0233087 A1 * | 9/2012 | Wanker | 705/347 |

\* cited by examiner

*Primary Examiner* — Mila Airapetian
(74) *Attorney, Agent, or Firm* — Steven M. Greenberg, Esq.; CRGO Law

(57) ABSTRACT

A method, system, and computer-program product for automatically monitoring websites (e.g., web-based shopping sites, catalogs, auction sites, etc.) for acquisition parameters (e.g., prices, rental amounts, trading/barter requirements, etc.) on one or more commodities, for a predetermined time period.

21 Claims, 3 Drawing Sheets

METHOD, SYSTEM, AND COMPUTER PROGRAM PRODUCT FOR LONG-TERM ON-LINE COMPARISON SHOPPING

BACKGROUND OF THE INVENTION

1. Field of the Invention

This invention relates to E-commerce and, more particularly to online comparison shopping.

2. Description of the Related Art

The merger of the Internet and commerce to form what is now known worldwide as "E-commerce" has led to the proliferation of the use of the Internet and World Wide Web ("the web") for purchases of all kinds. Everything from airline tickets to automobiles to vitamins can be purchased on the web and such sales have experienced explosive growth.

A "web crawler" is a program that systematically fetches web pages, typically based upon the input of one or more search terms. Google (www.Google.com) is one example of a web crawler that has gained some notoriety. Using a web crawler, a consumer wishing to shop for a particular item, for example, an IBM Thinkpad® computer, can simply type in the search terms "IBM Thinkpad" and obtain a listing of pages that use this term. Obviously, such a search is extremely broad, as it will also return pages relating to Thinkpad repair, Thinkpad endorsements, and the like. A person trying to find Thinkpad vendors must wade through the numerous "hits" returned by the web crawler to locate those that are selling the article.

Another option is to go to the website of a known retailer, e.g., www.CircuitCity.com or www.CompUSA.com, and perform a search within their website for the desired item. While this is an acceptable option, it requires multiple entry of the same query at each site, and also requires that the shopper be aware of the various sites and their web addresses.

To simplify a user's online shopping experience, a specialized form of web crawler, called a "shop-bot," was developed. Shop-bot sites such as www.Froogle.com and www.MySimon.com have refined the way in which many people do on-line shopping. Instead of going to several websites manually and then comparing prices among the websites, the shop-bot concept allows users to simultaneously find the current prices of a particular item on several websites, by inputting identification information (e.g., a part number) once and then issuing a search command to the shop-bot. Essentially, the shop-bot "crawls" only sites that sell the type of item being searched for, filtering out extraneous sites that are not E-commerce sites.

Shop-bots are beneficial to E-commerce shoppers and E-commerce sites. However, prices invariably vary from one day to the next, especially for "high tech" products. Thus, users who are truly bargain-conscious must repeatedly search the web, for days or weeks on end, in the hope that they hit the "best price" for the particular item they are looking for.

When on-line auction sites like eBay and Auctions by Amazon are considered, it becomes even more difficult. A search for an online auction may yield several items matching the desired item, and whose current bid price is quite low, but whose auctions do not end for several days.

What is needed is a way to seamlessly enable a user to identify a desired item and automatically monitor prices on the item for a predetermined time period.

SUMMARY OF THE INVENTION

The present invention is a method, system, and computer-program product for automatically monitoring websites (e.g., web-based shopping sites, catalogs, auction sites, etc.) for acquisition parameters (e.g., prices, rental amounts, trading/barter requirements, etc.) on one or more commodities, for a predetermined time period. In accordance with one embodiment of the present invention, the user uses an agent to set up a search strategy (e.g., recurring hourly, weekly, or daily) that scans one or more shop-bot sites and/or a set of other publicly-searchable websites to see if the item can be purchased for the target price or below. When a determination is made that the item can be purchased at or below the target price (an alarm condition), the agent asynchronously notifies the user (e.g., through a pop-up dialog or an email) of the details regarding where and how the item can be purchased. Optionally (or alternatively), the agent can initiate the purchase of the item from the vendor, if the agent is provided with appropriate information such as credit card numbers, shipping address, etc.

In a preferred embodiment, the user specifies items using one or more searchable parameters, e.g., by filling out a form, or via point-and-click methods on a vendor's website. On a pre-determined schedule, an agent searches a set of websites, including, for example, first-generation shop-bots like MySimon and Froogle, and/or optionally online discounters like Amazon, Walmart.com, Buy.com, etc. and auction sites like eBay, and determines if the item can be purchased for a pre-set maximum price. When a match is found (or when the search time limit expires) the user is notified either by popping up a dialog informing them of where the item can be found (including a link) or by sending an email containing the same information.

The present invention can be embodied in a client application (e.g., reside on a consumer's computer), a server application (e.g., reside on the server of a shop-bot), or can reside on a third-party server configured solely for the purpose of searching and monitoring searches on the websites of others.

DETAILED DESCRIPTION OF THE PREFERRED EMBODIMENTS

Figure 1:
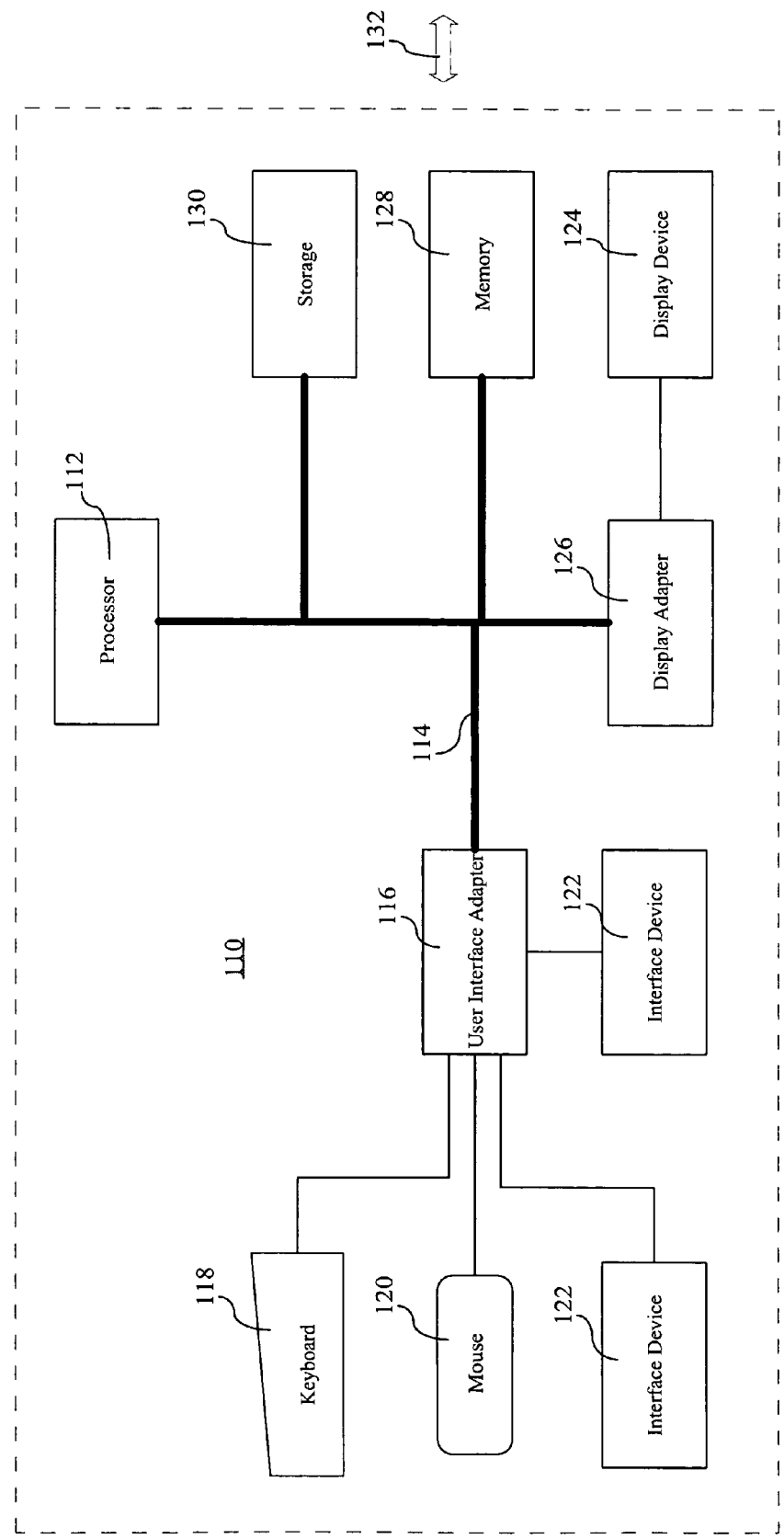
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer workstation 110, such as a personal computer, including related peripheral devices. The workstation 110 includes a microprocessor 112 and a bus 114 employed to connect and enable communication between the microprocessor 112 and the components of the workstation 110 in accordance with known techniques. The workstation 110 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 110 communicates via a communications channel 132 with other computers or networks of computers. The workstation 110 may be associated with such other computers in a local area network (LAN) or a wide area network, or the workstation 110 can be client in a client/server arrangement with another computer, etc. All of these configurations, as well as the appropriate communications hardware and software, are known in the art.

Figure 2:
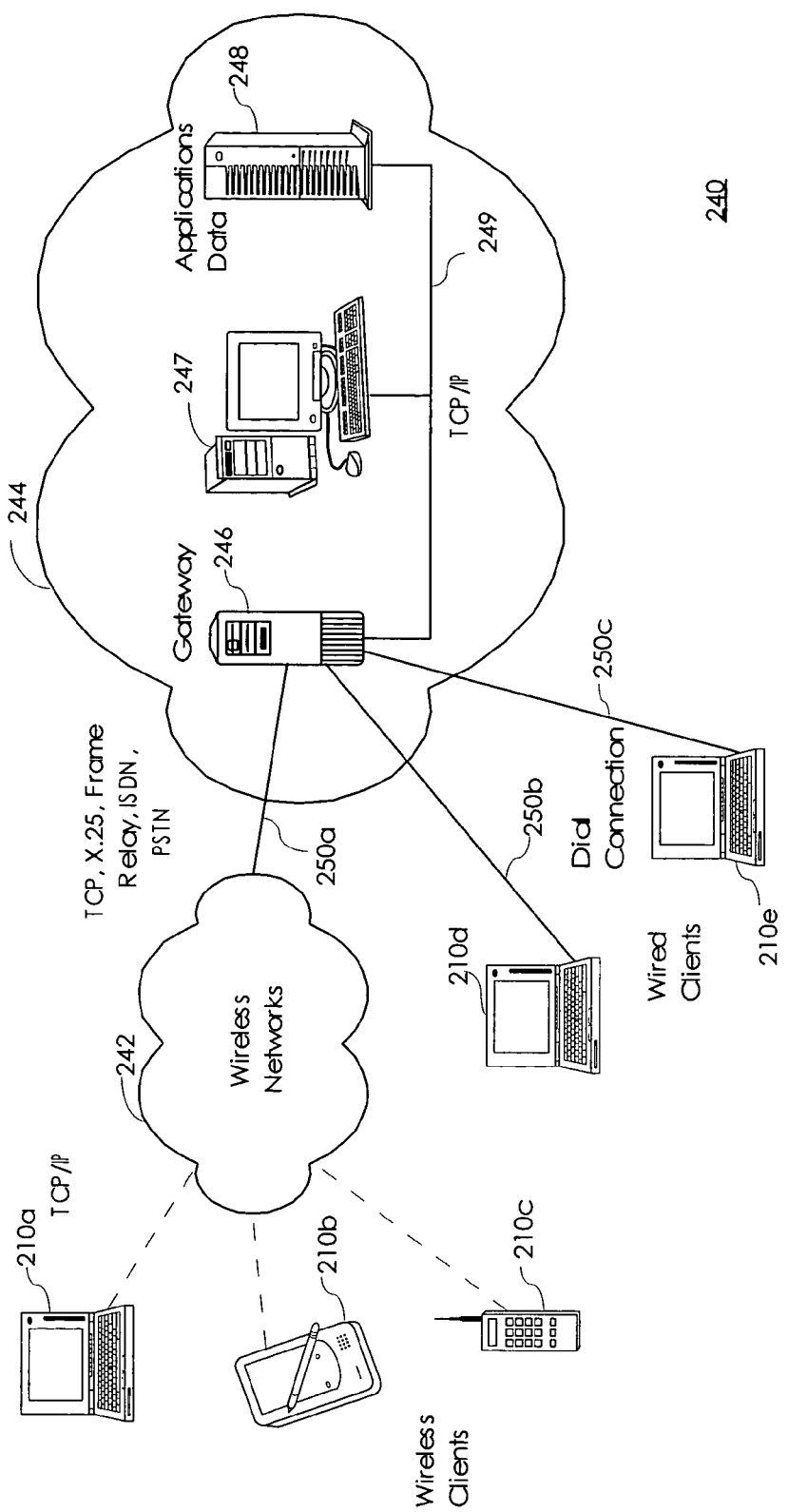
FIG. 2 illustrates an exemplary data processing network in which the present invention may be practiced.

FIG. 2 illustrates an exemplary data processing network 240 in which the present invention may be practiced. The data processing network 240 may include a plurality of individual networks, such as wireless network 242 and network 244, each of which may include a plurality of individual workstations/devices, e.g. 210a, 210b, 210c. Additionally, as those skilled in the art will appreciate, one or more LANs may be included (not shown), where a LAN may comprise a plurality of intelligent workstations coupled to a host processor.

The networks 242 and 244 may also include mainframe computers or servers, such as a gateway computer 246 or application server 247 (which may access a data repository 248). A gateway computer 246 serves as a point of entry into each network 244. The gateway computer 246 may be preferably coupled to another network 242 by means of a communications link 250a. The gateway computer 246 may also be directly coupled to one or more workstations, e.g. 210d, 210e using a communications link 250b, 250c. The gateway computer 246 may be implemented using any appropriate processor, such as IBM's Network Processor. For example, the gateway computer 246 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 246 may also be coupled 249 to a storage device (such as data repository 248). Further, the gateway 246 may be directly or indirectly coupled to one or more workstations/devices 210d, 210e, and servers such as application server 247.

Those skilled in the art will appreciate that the gateway computer 246 may be located a great geographic distance from the network 242, and similarly, the workstations/devices may be located a substantial distance from the networks 242 and 244. For example, the network 242 may be located in California, while the gateway 246 may be located in Texas, and one or more of the workstations/devices 210 may be located in New York. The workstations/devices 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations/devices 210 may alternatively connect directly to the gateway 246 using dial connections 250b or 250c. Further, the wireless network 242 and network 244 may connect to one or more other networks (not shown), in an analogous manner to that depicted in FIG. 2.

The present invention may be used on a client computer or server in a networking environment, or on a standalone workstation (for example, to prepare a file or to process a file which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wired" connection or a "wireless" connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Figure 3:
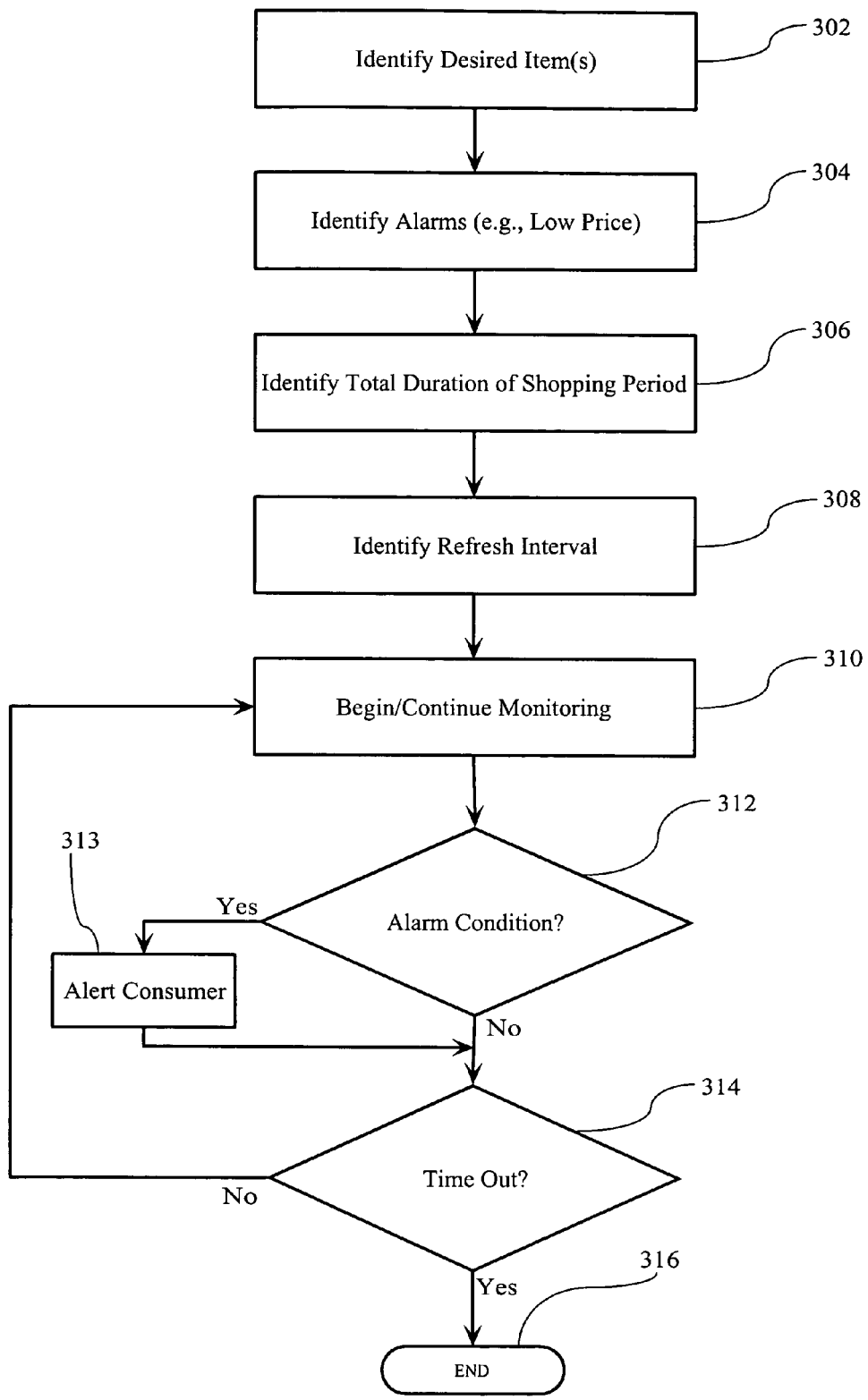
FIG. 3 is a flowchart illustrating an example of steps performed in accordance with the present invention.

FIG. 3 is a flowchart illustrating an example of steps performed in accordance with the present invention. The steps of FIG. 3 are but one way of implementing the steps performed as described herein, and it is understood that practitioners of ordinary skill in the programming arts can come up with numerous alternative embodiments which fall within the scope of the description herein and the claims appended hereto.

At step 302, a user of the system identifies one or more desired commodities to be acquired and/or monitored for possible acquisition ("commodities" can include tangible goods, services, or anything else that can be acquired via purchase, trade or barter on the Internet). The consumer can be presented with a "fill-in-the-blank" form where information is provided into pre-selected fields. Alternatively, the user may be given an option of filling out the fields using point-and-click methods that provide the user with pre-selected choices for the blanks in the fields. Any known method for providing the information related to the purchase can be utilized.

As part of the identification step, the consumer may also be asked to identify the scope of the search. For example, the user can select from a list of shop-bot sites, from a list of e-commerce sites, from a category of sites (e.g., the user can select from certain categories such as "consumer electronics", "home furnishings", "office equipment", etc.) or other similar selection options that direct the search to be conducted in publicly-searchable records, and/or can select from combinations of these options.

Accordingly, after completing step 302, the user will have identified one or more locations to be monitored, and one or more items to be purchased/monitored at those locations using one or more searchable parameters (e.g., by identifying at least a part number, and possibly a vendor) or a description (e.g., "20-in. flat screen television"). Optionally, the user may have also identified the scope of the search.

At step 304, the consumer can be given the option of identifying alarm conditions, that is, conditions which, if reached, will result in the consumer being advised of the occurrence of the condition or which will trigger some other event desired by the user. For example, the user can indicate that if a particular acquisition parameter (e.g., a particular low price) is found during the searching process that the user be immediately advised of this occurrence. Alternatively, (or in addition) if the user has input appropriate purchase information and it will be accepted by the vendor who is offering the product at the low price, an automatic "purchase request" can be sent to the vendor to purchase the item at the low price. Any other alarm conditions desired to be monitored can be included at the alarm identification step, including, for example, an alert indicating that an item has become unavailable at all vendors (for instance, due to production or manufacturing problems limiting availability).

At step 306, the consumer identifies a monitoring duration (e.g., the total duration of the shopping period). This involves selection of a date and time for completion of the monitoring and/or a date and time range (for example, if the user wishes to start the monitoring process on a future date). At step 308, the consumer identifies the "refresh interval" for the search process. For example, the consumer may wish to check prices three times a day, once a day, once a week, or some other desired interval. The user can be given the option of selecting these refresh intervals from drop-down menus or can be given the ability to name specific dates and times by keyboard input.

Once steps 302-308 have been completed, the product(s) being monitored have been identified and the scope and duration of the monitoring process is defined. At step 310, the monitoring process commences. At step 312, a determination is made as to whether or not any alarm conditions have been met. If no alarm conditions have been met, the process proceeds to step 314, where a determination is made as to whether or not a time-out condition has occurred. A time-out condition occurs when the end time and date specified in step 306 has been reached. If the time-out condition exists, the process proceeds to step 316, and the process stops. However, if the time-out condition has not been met, the process proceeds back to step 310 where the monitoring continues.

If at step 312, a determination is made that an alarm condition has been met, then at step 313, the user is informed of the meeting of the alarm condition in the desired manner specified. For example, the user may receive an instant message or email indicating that the alarm condition has been met. A pop-up alarm can appear on the user's desktop to indicate the occurrence of the alarm condition, or a page can be sent to a pager carried by the user. Any known method for identifying to the user the existence of the alarm condition can be used and falls within the scope of the present invention. The process then proceeds to step 314 as shown.

Using the above-described system, a user does not have to continually enter web addresses, part numbers and other specific items to monitor prices for products or other commodities over a period of time; they simply enter them once, specify the time period and wait for the results. The user can also manually visit the site at any time, to monitor the current search results. This simplifies the e-commerce experience for the user, benefiting both the e-commerce consumer and the e-commerce vendors.

As described above, the user provides enough information to describe the item (including the name of the item, or other identification information (if applicable) such as manufacturer, ISBN number, etc.), a "maximum price" and/or target low price, and a search limit (e.g., when the agent is to stop searching for the best price on this item). Two implementation models are now described:

(a) In a first embodiment, the present invention comprises a client-side browser plug-in. By extending the client browser to allow a context-menu "popup" to process an item, the user can define the information needed for the above-described search template. The plug-in then runs searches as a background thread whenever the browser is active. This has the advantage of not requiring additional software to be downloaded beyond the browser plug-in. When a search criteria is met, the browser plug-in pops-up a dialog informing the user that a match has been made, or highlights a customized button or icon elsewhere in the browser's frame that the user clicks on to find the information they have requested.

(b) In a second embodiment, the invention is included as part of a website. In the simplest form, the website takes a URL link to an item (copied from a browser URL), the maximum price desired, and the search term time-limit, and the email address of the end-user requesting the search. The user may also provide the information to describe the item through a more limited-functionality plug-in that gathers the information, but does not actually run the search. This plugin would simply forward a request to perform the search to another, remote computer. In this case, the search would not run on the client computer, but would instead run on a remote server computer that would be responsible for performing the search on the appointed schedule. In this case, a single web site could perform searches for multiple users and could reduce the total number of searches by combining the results of related searches.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation of a user, or of a website. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions. These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-3 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art. For example, while the focus of the above disclosure is on monitoring potential on-line purchases, it can easily be applied to monitoring rental items, barter sites, auction and other on-line purveyors that offer users the ability to acquire commodities for a fluctuating value. It is intended that the present invention encompass such changes and modifications as fall within the scope of the appended claims.

I claim:

1. A computer-implemented method for identifying acquisition parameters for one or more commodities, comprising the steps of:
    identifying said one or more commodities using one or more searchable identification parameters by processing information defined by a user in a template associated with a client-side browser plug-in;
    defining a monitoring duration during which acquisition parameters for said one or more commodities will be monitored, including
        defining an overall duration for conducting said monitoring step; and
        defining a refresh interval for said monitoring step;
    setting multiple different alarm conditions on at least one of the acquisition parameters;
    monitoring, by directing the client-side browser plug-in to execute as a background thread, database searches of multiple different publicly-searchable, network-accessible databases for acquisition parameters for said one or more commodities using said one or more searchable identification parameters;
    determining whether any of the alarm conditions are met by the acquisition parameters while monitoring the databases; and
    triggering an event responsive to an alarm condition having been met before completing the monitoring of the databases.

2. The computer-implemented method of claim 1, wherein said one or more publicly-searchable databases includes shop-bot sites.

3. The computer-implemented method of claim 1, wherein said event includes sending an email to a user of said method upon the occurrence of one or more of said alarm conditions.

4. The computer-implemented method of claim 1, wherein said event includes sending an electronic page to a user of said method upon the occurrence of one or more of said alarm conditions.

5. The computer-implemented method of claim 1, wherein said event includes sending an instant message to a user of said method upon the occurrence of one or more of said alarm conditions.

6. The computer-implemented method of claim 1, wherein one of said one or more alarm conditions comprises an acquisition parameter reaching a predefined minimum value.

7. The computer-implemented method of claim 6, wherein said acquisition parameter comprises a sale price.

8. A computer-implemented system for identifying acquisition parameters for one or more commodities, comprising:
    a processor configured to perform
        identifying said one or more commodities using one or more searchable identification parameters by processing information defined by a user in a template associated with a client-side browser plug-in;
        defining a monitoring duration during which acquisition parameters for said one or more commodities will be monitored, including
            defining an overall duration for conducting said monitoring step; and
            defining a refresh interval for said monitoring step;
        setting multiple different alarm conditions on at least one of the acquisition parameters;
        monitoring, by directing the client-side browser plug-in to execute as a background thread, database searches of multiple different publicly-searchable, network-accessible databases for acquisition parameters for said one or more commodities using said one or more searchable identification parameters;
        determining whether any of the alarm conditions are met by the acquisition parameters while monitoring the databases; and
        triggering an event responsive to an alarm condition having been met before completing the monitoring of the databases.

9. The computer-implemented system of claim 8, wherein said one or more publicly-searchable databases includes shop-bot sites.

10. The computer-implemented system of claim 8, wherein said event includes sending an email to a user of said method upon the occurrence of one or more of said alarm conditions.

11. The computer-implemented system of claim 8, wherein said event includes sending an electronic page to a user of said method upon the occurrence of one or more of said alarm conditions.

12. The computer-implemented system of claim 8, wherein said event includes sending an instant message to a user of said method upon the occurrence of one or more of said alarm conditions.

13. The computer-implemented system of claim 8, wherein one of said one or more alarm conditions comprises an acquisition parameter reaching a predefined minimum value.

14. The computer-implemented system of claim 13, wherein said acquisition parameter comprises a sale price.

15. A computer program product for identifying acquisition parameters for one or more commodities, the computer program product comprising a computer-readable storage medium having computer-readable program code embodied in the medium, the computer-readable program code, when executed on a computer, causes the computer to perform:
    identifying said one or more commodities using one or more searchable identification parameters by processing information defined by a user in a template associated with a client-side browser plug-in;
    defining a monitoring duration during which acquisition parameters for said one or more commodities will be monitored, including
        defining an overall duration for conducting said monitoring step; and
        defining a refresh interval for said monitoring step;
    setting multiple different alarm conditions on at least one of the acquisition parameters;
    monitoring, by directing the client-side browser plug-in to execute as a background thread, database searches of multiple different publicly-searchable, network-accessible databases for acquisition parameters for said one or more commodities using said one or more searchable identification parameters;
    determining whether any of the alarm conditions are met by the acquisition parameters while monitoring the databases; and
    triggering an event responsive to an alarm condition having been met before completing the monitoring of the databases.

16. The computer program product of claim 15, wherein said one or more publicly-searchable databases includes shop-bot sites.

17. The computer program product of claim 15, wherein said event includes sending an email to a user of said method upon the occurrence of one or more of said alarm conditions.

18. The computer program product of claim 15, wherein said event includes sending an electronic page to a user of said method upon the occurrence of one or more of said alarm conditions.

19. The computer program product of claim 15, wherein said event includes sending an instant message to a user of said method upon the occurrence of one or more of said alarm conditions.

20. The computer program product of claim 15, wherein one of said one or more alarm conditions comprises an acquisition parameter reaching a predefined minimum value.

21. The computer program product of claim 20, wherein said acquisition parameter comprises a sale price.

\* \* \* \* \*